United States Patent
Hia et al.

(10) Patent No.: US 10,152,443 B2
(45) Date of Patent: *Dec. 11, 2018

(54) SYSTEM AND METHOD FOR PROVIDING PERSONALITY SWITCHING IN A SOLID STATE DRIVE DEVICE

(71) Applicant: DELL PRODUCTS, LP, Round Rock, TX (US)

(72) Inventors: Swee Chay Hia, Singapore (SG); Munif M. Farhan, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,347

(22) Filed: Nov. 30, 2016

(65) Prior Publication Data

US 2017/0083470 A1    Mar. 23, 2017

Related U.S. Application Data

(63) Continuation of application No. 14/473,689, filed on Aug. 29, 2014, now Pat. No. 9,524,108.

(51) Int. Cl.
| | |
|---|---|
| *G06F 12/00* | (2006.01) |
| *G06F 13/40* | (2006.01) |
| *G06F 3/06* | (2006.01) |
| *G06F 13/42* | (2006.01) |
| *G06F 13/28* | (2006.01) |
| *G06F 12/02* | (2006.01) |

(52) U.S. Cl.
CPC .......... *G06F 13/4022* (2013.01); *G06F 3/061* (2013.01); *G06F 3/0659* (2013.01); *G06F 3/0679* (2013.01); *G06F 12/0246* (2013.01); *G06F 13/28* (2013.01); *G06F 13/4221* (2013.01); *G06F 13/4282* (2013.01); *G06F 2212/7201* (2013.01); *G06F 2213/0026* (2013.01)

(58) Field of Classification Search
None
See application file for complete search history.

(56) References Cited

U.S. PATENT DOCUMENTS

| | | |
|---|---|---|
| 8,943,226 B1 | 1/2015 | Hoglund et al. |
| 2003/0179492 A1 | 9/2003 | Kang et al. |
| 2005/0094343 A1 | 5/2005 | Mintz |
| 2007/0035783 A1 | 2/2007 | Hall et al. |
| 2008/0059670 A1* | 3/2008 | Lui ................ G06F 3/0614 710/110 |
| 2009/0237836 A1 | 9/2009 | Hendriks |
| 2012/0154953 A1 | 6/2012 | Darius et al. |
| 2012/0204722 A1 | 8/2012 | Watkins |
| 2013/0086311 A1 | 4/2013 | Huang et al. |

(Continued)

*Primary Examiner* — Kaushikkumar M Patel
(74) *Attorney, Agent, or Firm* — Larson Newman, LLP

(57) ABSTRACT

A solid state drive (SSD) device includes a Peripheral Component Interconnect-Express (PCIe) interface, a non-volatile storage media, and a memory that stores code, the code including an Advanced Host Controller Interface (AHCI) controller, and a Non-Volatile Memory-Express (NVMe) controller. The SSD device is operable to select one of the AHCI controller and the NVMe controller to process data storage commands between the PCIe interface and the non-volatile storage media.

19 Claims, 3 Drawing Sheets

(56) References Cited

U.S. PATENT DOCUMENTS

2014/0337540 A1* 11/2014 Johnson .................. G06F 13/14
710/5
2015/0160886 A1* 6/2015 Hoglund ............... G06F 3/0656
710/18
2015/0220278 A1 8/2015 Sarcone et al.

* cited by examiner

SYSTEM AND METHOD FOR PROVIDING PERSONALITY SWITCHING IN A SOLID STATE DRIVE DEVICE

CROSS-REFERENCE TO RELATED APPLICATION

This application is a continuation of U.S. patent application Ser. No. 14/473,689, entitled "System Method for Providing Personality Switching in a Solid State Drive Device," filed on Aug. 29, 2014, now U.S. Pat. No. 9,524,108, the disclosure of which is hereby expressly incorporated by reference in its entirety.

FIELD OF THE DISCLOSURE

This disclosure generally relates to information handling systems, and more particularly relates to providing personality switching in a solid state drive device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

An information handling system can include a solid state drive (SSD) that communicates with the information handling system via a Peripheral Component Interface-Express (PCIe) interface. The SSD can operate according to an Advanced Host Controller Interface (AHCI) standard or according to a Non-Volatile Memory-Express (NVMe) standard.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
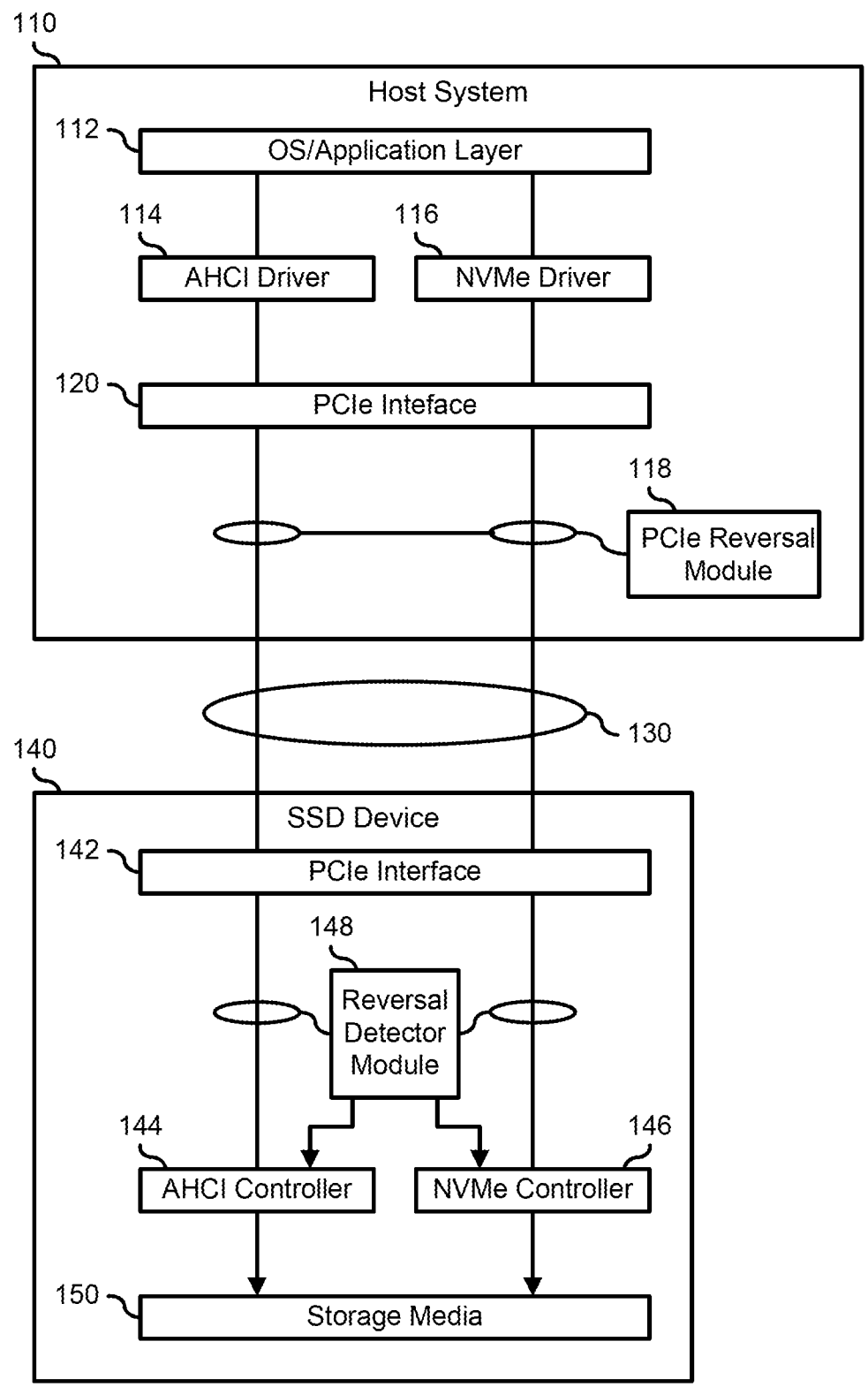
FIG. 1 is a block diagram illustrating an information handling system providing personality switching in a solid state drive device according to an embodiment of the present disclosure.

FIG. 1 illustrates an information handling system 100 including a host system 110 connected to a solid state drive (SSD) device 140 via a Peripheral Component Interconnect-Express (PCIe) link 130. Host system 110 includes an OS/application layer 112, an Advanced Host Controller Interface (AHCI) driver 114, a Non-Volatile Memory-Express (NVMe) driver 116, a PCIe reversal module 118, and a PCIe interface 120. SSD device 140 includes a PCIe interface 142, an AHCI controller 144, a NVMe controller 146, a reversal detector module 148, and a storage media 150. In a particular embodiment, SSD device 140 includes a memory for storing operating firmware for the SSD device. Here, controllers 144 and 146 and reversal detector module 148 are stored in the firmware memory. The firmware memory also stores configuration information for SSD device 140, as described below.

OS/application layer 112 operates to process information on host system 110, including data storage operations on SSD device 140. The data storage operations are directed to SSD device 140 via one of AHCI driver 114 or NVMe driver 116, as described further, below. PCIe interface 120 receives data storage operations from drivers 114 or 116, and communicates the data storage operations over PCIe link 130 to PCIe interface 142. SSD device 140 is a multi-namespace PCIe device that supports an AHCI namespace that accesses AHCI controller 144, and a NVMe namespace that accesses NVMe controller 146. As such, SSD device 140 can execute data storage operations from AHCI driver 114 that are based upon an AHCI set of commands or can execute data storage operations from NVMe driver 116 that are based on a NVMe set of commands, to store and retrieve data from storage media 150, and to perform other functions related to the operation of SSD device 140. In a particular embodiment, one or more of AHCI driver 114 and NVMe driver 116 resides on SSD device 140, as needed or desired.

In a particular embodiment, not shown, host system 110 operates to determine whether a SSD device is a SATA SSD device or a PCIe SSD device, based upon signal pin connections in the connector of the SSD device. For example, host system 110 can detect that a PEDET pin of the SSD device is tied to a circuit ground (GND) and can thereby determine that the SSD device is a SATA SSD device, or can detect that the PEDED pin is not connected to any circuit element (N/C) and can thereby determine that the SSD device is a PCIe SSD device. Host system 110 further operates to determine whether a PCIe SSD device is configured as an AHCI SSD device or as a NVMe SSD device. Here, upon detecting which type of PCIe SSD device is connected to host system 110, the host system operates with correct driver module to operate compatibly with the PCIe SSD device. Thus host system 110 can include compatibility modes for operating SATA SSD devices, AHCI PCIe SSD devices, and NVMe SSD devices.

Information handling system 110 operates such that host system 110 and SSD device 140 each support a PCIe mode reversal functionality. Here, host system 110 and SSD device 140 are each configurable in a default PCIe mode. As such, host system 110 is configurable to have AHCI driver 114 enabled by default, or to have NVME driver 116 enabled by default. For example, the default mode for host system 110 can be configured based upon a BIOS or UEFI setting, upon a hardware setting, upon another configuration method, or a combination thereof. Further, SSD device 140 is configurable to have AHCI controller 144 enabled by default, or to have NVME controller 146 enabled by default. For example, SSD device 140 can be factory configured, configured based upon a firmware setting, based upon another configuration method, or a combination thereof.

When both host system 110 and SSD device 140 are configured with the same default mode, then the host system installs its default driver 114 or 116, and the SSD device is pre-configured to respond with its default controller 144 or 146. For example, when host system 110 is configured as an AHCI default host system and SSD device 140 is configured as an AHCI default SSD device, then the host system installs AHCI driver 114 and the SSD device responds to data storage operations using AHCI controller 144. Similarly, when host system 110 is configured as a NVMe default host system and SSD device 140 is configured as a NVMe default SSD device, then the host system installs NVMe driver 116 and the SSD device responds to data storage operations using NVMe controller 146.

However, when host system 110 and SSD device 140 are configured with different default modes, then the host system operates to implement the PCIe mode reversal functionality to direct the SSD device to reverse from the default mode to the secondary mode, the host system installs its default driver 114 or 116, and the SSD device responds with its secondary controller 146 or 144. For example, when host system 110 is configured as an AHCI default host system and SSD device 140 is configured as a NVMe default SSD device, then the host system directs the SSD device to reverse to an AHCI SSD device and installs AHCI driver 114, and the SSD device responds to data storage operations using AHCI controller 144. Similarly, when host system 110 is configured as a NVMe default host system and SSD device 140 is configured as a AHCI default SSD device, then the host system directs the SSD device to reverse to an NVMe SSD device and installs NVMe driver 116, and the SSD device responds to data storage operations using NVMe controller 146.

PCIe reversal module 118 operates to direct the SSD device to reverse from the default mode to the secondary mode. Reversal detector module 148 operates to receive the direction to reverse SSD device 140 from the default mode to the secondary mode. In a particular embodiment, host system 110 and SSD device 140 are configured to perform the PCIe mode reversal functionality based upon a hardware handshake between the host system and the SSD device. For example, where SSD device 140 includes a connector that is compliance with the PCI Express M.2 Electromechanical Specification Socket 2 or Socket 3 connector, PCIe reversal module 118 can detect that pin #6 is tied to a circuit ground (GND) and can thereby determine that the SSD device supports the PCIe mode reversal functionality. In response, PCIe reversal module 118 can pull pin #8 to a circuit high voltage level to signal to SSD device 140 that the PCIe mode reversal functionality shall be invoked in the SSD device. Here, reversal detector module 148 can detect that pin #8 has been pulled high and can direct SSD device 140 to reverse from the default mode to the secondary mode. If, in detecting pin #6, PCIe reversal module 118 detects that pin #6 is not connected to any circuit element (N/C), then host system 110 can provide an error indicating that no reversible SSD device was detected, or, in the alternative, the host system can install the driver 114 or 116 that is compatible with the default mode of SSD device 140, as described above. In another embodiment, in directing SSD device 140 to reverse from the default mode to the secondary mode, reversal detection module 148 operates to simulate a reinstallation of SSD device 140 with the secondary mode controller 144 or 146 actuated.

In another embodiment, host system 110 and SSD device 140 are configured to perform the PCIe mode reversal functionality based upon a firmware solution between the host system and the SSD device. For example, host system 110 can evoke a vendor specific command associated with SSD device 140. Here, it directs SSD device 140 to reverse from the default mode to the secondary mode. Reversal detection module 148 sets a status for the SSD device 140, such that the default mode is reversed. In this way, when information handling system 100 is rebooted, both host system 110 and SSD device 140 are configured with the same default mode, thereby effectuating the desired reversal.

In a particular embodiment, host system 110 is configurable to implement the PCIe mode reversal functionality based upon a BIOS or UEFI setting, upon a hardware setting, upon another configuration method, or a combination thereof. Here, when host system 110 and SSD device 140 are detected as being configured with different default modes, information handling system 100 can invoke the PCIe mode reversal functionality when the PCIe mode reversal functionality is enabled. However, when the PCIe mode reversal functionality is disabled, then host system 110 can provide an error indicating that no reversible SSD device was detected, or, in the alternative, the host system can install the driver 114 or 116 that is compatible with the default mode of SSD device 140, as described above.

Figure 2:
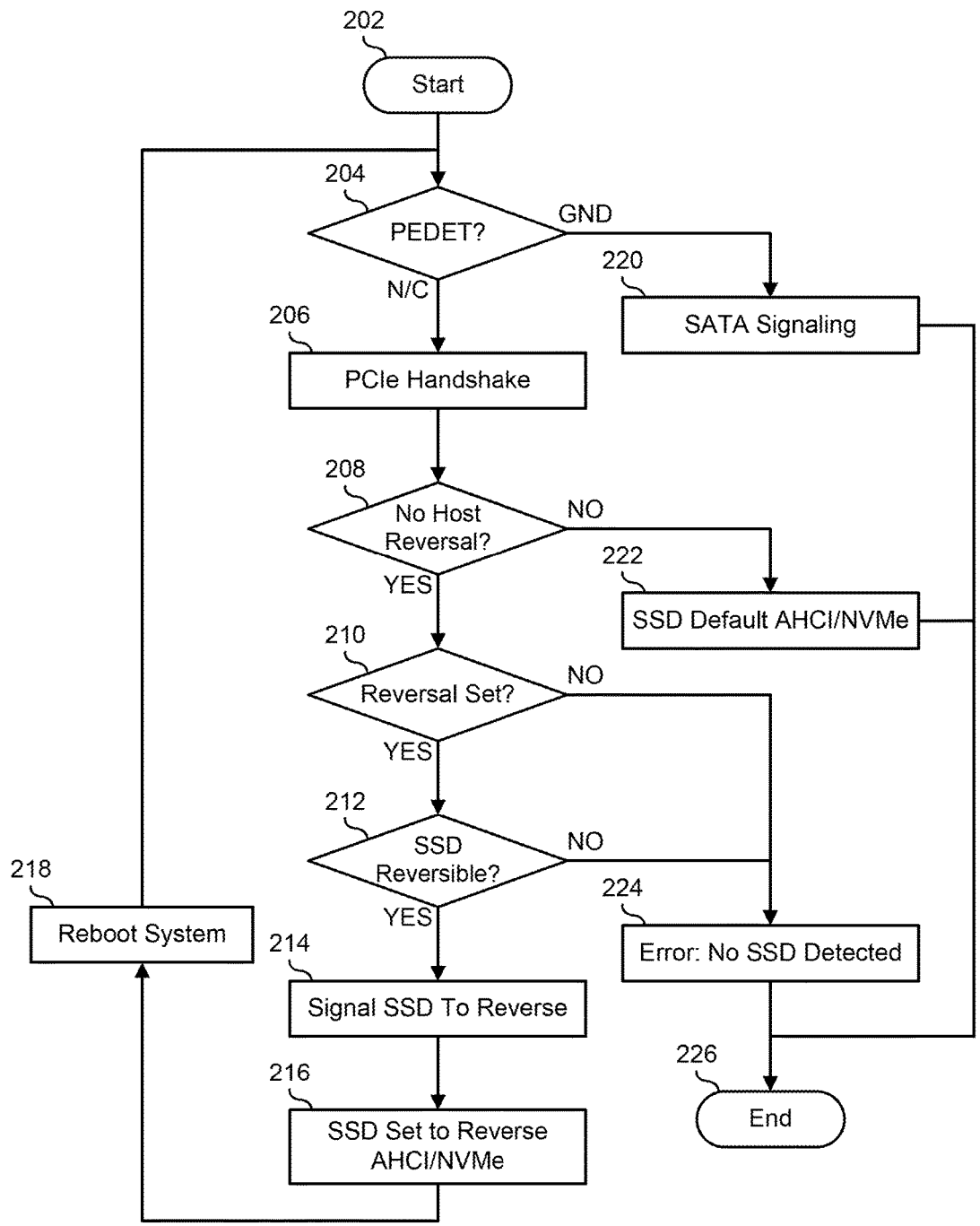
FIG. 2 is a flowchart illustrating a method for providing personality switching in a solid state drive device according to an embodiment of the present disclosure.

FIG. 2 illustrates a method for providing personality switching in a solid state drive device, starting at block 202. When a host system is powered on or otherwise reset, a decision is made as to whether or not a PEDET pin of a connector to a SSD device that is connected to the host system is tied to a circuit ground (GND) or is not connected to any circuit element (N/C) in decision block 204. If the PEDET pin is tied to the circuit ground (GND), the "GND" branch of decision block 204 is taken and the SSD device is determined to be a SATA SSD device in block 220 and the method ends in block 226. If the PEDET pin is not connected to any circuit element (N/C), the "N/C" branch of decision block 204 is taken, and, in an optional step, a PCIe handshake is shared with the SSD device in block 206 to initialize the PCIe interface. Here, it is implied by the fact that the PEDET pin is not connected to any circuit element (N/C) that the connected SSD device is a PCIe SSD device.

A decision is made as to whether or not the host system shall need to make a host interface reversal in decision block 208. For example, the host system can be set as an AHCI default host system and the SSD device can be set as a default AHCI SSD device. Here, when the host system initiates data storage operations using an AHCI driver, the SSD device will respond using its AHCI controller, and the host system will detect that the SSD device is operating compatibly with the host system. On the other hand, if an AHCI default host system is desired and the SSD device is set as a default NVMe SSD device, then, we have a miss configuration issue. If the host system does not need to make a host reversal, the "YES" branch of decision block 208 is taken, the SSD device is operated in its default mode in block 222, and the method ends in block 226.

If the host system needs to make a host interface reversal, the "NO" branch of decision block 208 is taken and a decision is made as to whether or not the host system is configured to initiate a PCIe mode reversal functionality on the SSD device in decision block 210. For example the host system can include a BIOS or UEFI setting that enables or disables the PCIe mode reversal functionality. If the host system is not configured with a PCIe mode reversal functionality supported SSD device, the "NO" branch of decision block 210 is taken, an error is flagged in the host system that no host interface reversal functionality supported SSD device is detected in block 224, and the method ends in block 226. In an optional embodiment, instead of flagging an error, the host system can install the driver that is compatible with the SSD device.

If the host system is configured to initiate the PCIe mode reversal functionality on the SSD device, the "YES" branch of decision block 210 is taken and a decision is made as to whether or not the SSD device supports the PCIe mode reversal functionality in decision block 212. For example, the host system can check the status of pin #6 to determine if the pin #6 is connected tied to a circuit ground (GND) or is not connected to any circuit element (N/C). If the pin #6 is tied to the circuit ground (GND), then the SSD device can be determined to support the PCIe mode reversal functionality, but if the pin #6 is not connected to any circuit element (N/C), then the SSD device can be determined to not support the PCIe mode reversal functionality. As another example, the host system can send a vendor specific command to the SSD device to determine if it supports the PCIe mode reversal functionality. If the SSD device does not support the PCIe mode reversal functionality, the "NO" branch of decision block 212 is taken, an error is flagged in the host system that no host interface reversal functionality supported SSD device is detected in block 224, and the method ends in block 226.

If the SSD device supports the PCIe mode reversal functionality, the "YES" branch of decision block 212 is taken, the host system provides an indication to the SSD device to initiate the PCIe mode reversal functionality in block 214, the SSD device sets itself to operate in the secondary mode in block 216, the host system reboots in block 218 and the method returns to decision block 204 where the PEDET decision is made. Note that here, when the method gets to decision block 208 for a second time, that the SSD device, having reversed itself, will now be determined to be operating compatibly with the host system in block 222, and the method will end in block 226.

Figure 3:
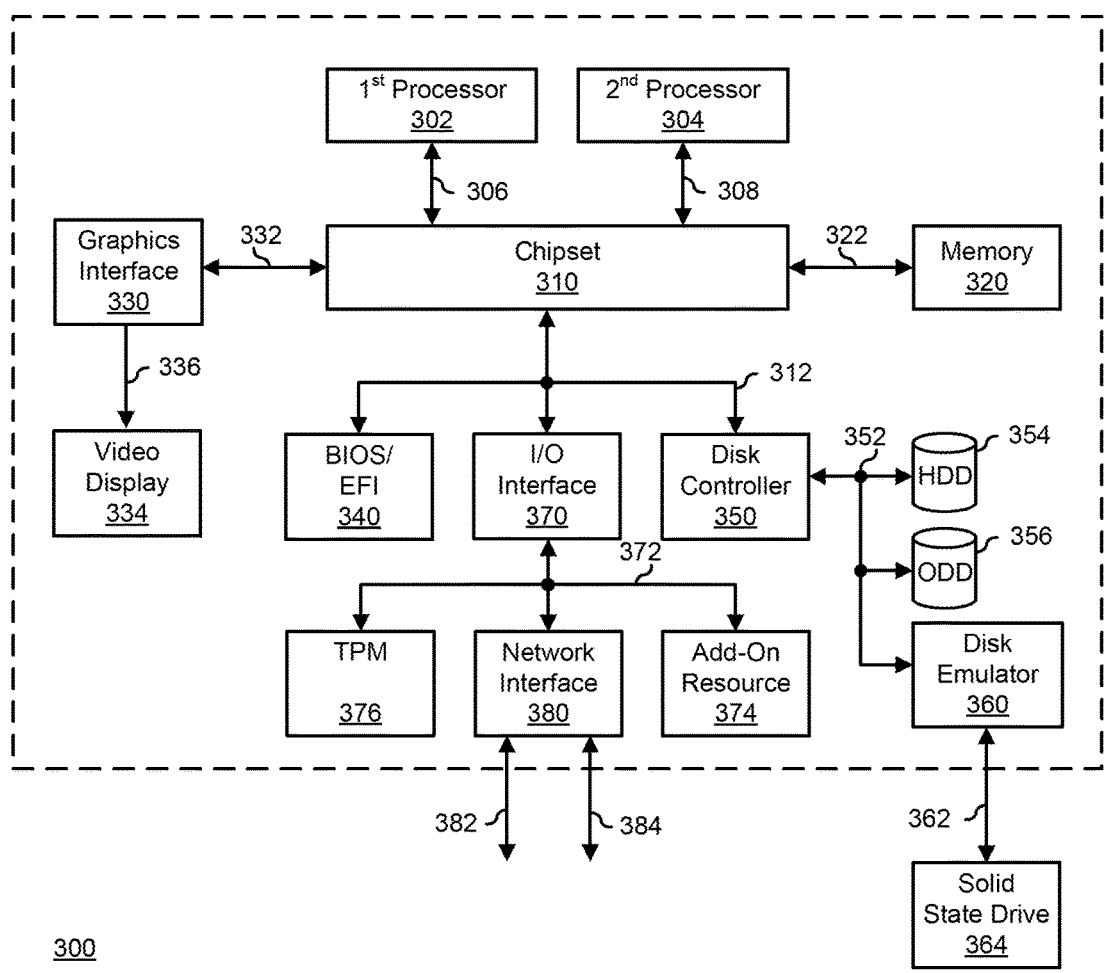
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes processors 302 and 304, a chipset 310, a memory 320, a graphics interface 330, a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A solid state drive (SSD) device comprising:
   a Peripheral Component Interconnect-Express (PCIe) interface;
   a non-volatile storage media; and
   a memory that stores code, the code including:
      an Advanced Host Controller Interface (AHCI) controller; and
      a Non-Volatile Memory-Express (NVMe) controller;
   wherein the SSD device is operable to select one of the AHCI controller and the NVMe controller to process data storage commands between the PCIe interface and the non-volatile storage media.

2. The SSD device of claim 1, further comprising:
   a reversal detector module operable to:
      detect that a host system coupled to the PCIe interface accesses the SSD device via a first driver associated with the default controller; and
      provide an indication to the host system that the default controller is associated with the first default controller.

3. The SSD device of claim 2, wherein in detecting that the host system accesses the SSD device via the first driver is based on a hardware detection.

4. The SSD device of claim 3, wherein the hardware detection includes the reversal detector module further operable to detect that a pin #8 of a Socket 2/3 connector is pulled to a circuit high voltage level.

5. The SSD device of claim 2, wherein in detecting that the host system accessed the SSD device via the first driver is based on a vendor specific command by the SSD device from the host system.

6. The SSD device of claim 2, wherein the reversal detector module is further operable to:
   detect that the host system accesses the SSD device via a second driver associated with the secondary controller; and
   set the secondary controller to process data storage commands between the PCIe interface and the non-volatile storage media in response to detecting that the host system accesses the SSD device via the second driver.

7. The SSD device of claim 1, wherein the SSD device is further operable provide an indication to a host system coupled to the PCIe interface that the select one of the AHCI controller and the NVMe controller processes data storage commands between the PCIe interface and the non-volatile storage media.

8. The SSD device of claim 7, wherein the indication is provided based upon a hardware configuration of the SSD device.

9. The SSD device of claim 8, wherein the hardware configuration includes a pin #6 of a Socket 2/3 connector that is pulled to a circuit ground.

10. A method comprising:
    storing, on a memory of a solid state drive (SSD) device:
       code for an Advanced Host Controller Interface (AHCI) controller; and
       code for a Non-Volatile Memory-Express (NVMe) controller; and selecting one of the AHCI controller and the NVMe controller to process data storage commands between a Peripheral Component Interconnect-Express (PCIe) interface of the SSD device and a non-volatile storage media of the SSD device.

11. The method of claim 10, further comprising:
detecting, by a reversal detector module of the SSD device, that a host system coupled to the PCIe interface accesses the SSD device via a first driver associated with the default controller; and
providing, by the reversal detector module, an indication to the host system that the default controller is associated with the first default controller.

12. The method of claim 11, wherein detecting that the host system accesses the SSD device is based on a hardware detection.

13. The method of claim 11, wherein detecting that the host system accessed the SSD device is based on a vendor specific command from the host system.

14. The method of claim 10, further comprising:
detecting, by the reversal detector module, that the host system accesses the SSD device via a second driver associated with the secondary controller; and
setting, by the reversal detector module, the secondary controller to process data storage commands between the PCIe interface and the non-volatile storage media in response to detecting that the host system accesses the SSD device via the second driver.

15. The method of claim 10, further comprising:
providing, by the SSD device, an indication to a host system coupled to the PCIe interface that the select one of the AHCI controller and the NVMe controller processes data storage commands between the PCIe interface and the non-volatile storage media.

16. A non-transitory computer-readable medium including code for performing a method, the method comprising:
storing code for an Advanced Host Controller Interface (AHCI) controller, and code for a Non-Volatile Memory-Express (NVMe) controller; and
selecting one of the AHCI controller and the NVMe controller to process data storage commands between a Peripheral Component Interconnect-Express (PCIe) interface of the SSD device and a non-volatile storage media of an SSD device.

17. The computer-readable medium of claim 16, the method further comprising:
detecting, by a reversal detector module of the SSD device, that a host system coupled to the PCIe interface accesses the SSD device via a first driver associated with the default controller; and
providing, by the reversal detector module, an indication to the host system that the default controller is associated with the first default controller.

18. The computer-readable medium of claim 16, the method further comprising:
detecting, by the reversal detector module, that the host system accesses the SSD device via a second driver associated with the secondary controller; and
setting, by the reversal detector module, the secondary controller to process data storage commands between the PCIe interface and the non-volatile storage media in response to detecting that the host system accesses the SSD device via the second driver.

19. The computer-readable medium of claim 16, the method further comprising:
providing, by the SSD device, an indication to a host system coupled to the PCIe interface that the select one of the AHCI controller and the NVMe controller processes data storage commands between the PCIe interface and the non-volatile storage media.

* * * * *